July 25, 1939.  A. O. WILLIAMS  2,167,164
MOTOR MOUNTING MEANS
Filed May 21, 1937  2 Sheets-Sheet 1

Fig.1.

Inventor:
Alfred O. Williams.
By Walter E. Schirmer
Atty.

July 25, 1939.          A. O. WILLIAMS          2,167,164
MOTOR MOUNTING MEANS
Filed May 21, 1937          2 Sheets-Sheet 2

Inventor:
Alfred O. Williams.
By Walter E. Schirmer
Atty.

Patented July 25, 1939

2,167,164

UNITED STATES PATENT OFFICE

2,167,164

MOTOR MOUNTING MEANS

Alfred O. Williams, Battle Creek, Mich., assignor to Clark Equipment Company, Battle Creek, Mich., a corporation of Michigan Application May 21, 1937, Serial No. 143,888

4 Claims. (Cl. 248—26)

This invention relates to motor mounting means and more particularly is directed to mounting means for supporting an electric motor or the like in position on the truck of a rail vehicle such as a streetcar, rail car or similar structure.

In recent development of high speed cars of this type which are supported on trucks in such manner that the vibrations and noises within the truck are not transmitted to the car body, it has been found that the motor for driving the axles of the truck has not been effectively shielded and that noises developed thereby are transmitted through engaged metal portions of the truck structure and produce undesirable transmission of these noises to the interior of the car body.

Such motors are usually mounted in a cradle structure extending transversely of the truck and rigidly supported by the side frame members of the truck which form the journals for the drive axles. The motors are subjected to stresses tending to move them longitudinally with respect to the cradle, and also stresses tending to rotate the motor frame within the cradle.

The present invention contemplates broadly, the provision of a mounting means for this type of motor which will prevent the transmission of noises from the motor to the truck frame, and which, at the same time, will provide a resilient support for the motor capable of resisting the stresses tending to move the motor frame body with respect to the cradle.

In a preferred embodiment of the present invention, the mounting means comprises rubber sandwich-like supporting members curved to fit the exterior surface of the motor frame and carrying metallic plates on the surfaces thereof whereby they may be joined to the motor frame and to the supporting cradle structure, while the rubber material forms a cushioning and noise insulating barrier and prevents any metal to metal contact between the parts. Any stresses tending to move the motor frame either longitudinally of the cradle or to rotate the same with respect to the cradle place the resilient supporting means in shear stress. It has been found that rubber acts best for the support of members when it is subjected to initial lateral compression and is then placed in such position that any stresses imposed thereon will tend to shear the rubber between the opposed metallic plate surfaces which are vulcanized to the opposite sides of the rubber cushioning member. The present invention takes advantage of this property of the cushioning material to an extent such that an efficient noise insulating and cushioning means is produced which will hold the motor frame firmly in place with respect to the truck, and will resist all stresses tending to effect bodily movement of the frame.

Another object of the present invention is to provide a simplified mounting means which may be readily employed in connection with the type of truck construction now in use, and which may be easily manufactured and assembled in position. The construction is designed so that connection of the motor frame to the supporting cradle through the mounting means is facilitated, and so that the mechanism can be easily disassembled when it is necessary to inspect, repair or replace the motor.

Other objects and advantages of the present invention will appear more fully from the following detailed description which, taken in conjunction with the accompanying drawings, will disclose to those skilled in the art the operation of a preferred form of the present invention.

In the drawings:

Figure 4 is a sectional view taken substantially on line 4—4 of Figure 1.

Referring now in detail to the drawings, I have indicated the motor frame generally at 5, this comprising the outer substantially cylindrical housing which encloses an electric motor of the type used in drive structures for trucks of this general character. A supporting cradle member 6, preferably formed as a casting, is adapted to extend between two longitudinal side members of the truck frame, and is rigidly connected thereto. The cradle member has a rounded opening formed therein which is adapted to form a cradle for the motor housing, and which is provided with an arcuate cap member 7 having flanged ends secured to the cradle by means of the bolts 8 to form a cylindrical opening of a slightly larger diameter than the external diameter of the motor frame 5.

Figure 1:
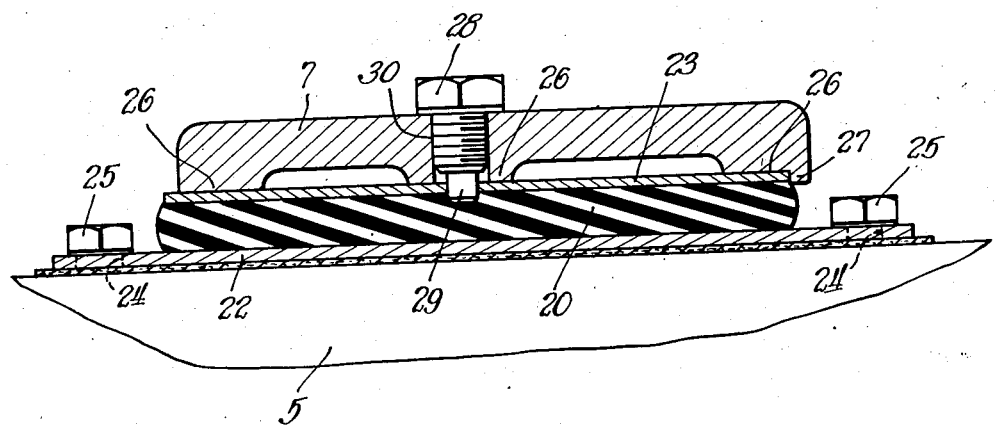
Figure 1 is a side elevational view showing the motor supported by the mounting means of the present invention in a truck frame.

The motor is supported at its lower periphery on the lower portion of the cradle opening by means of a resilient cushioning member indicated generally at 9, this cushioning member comprising a resilient rubber member confined between and vulcanized on opposite lateral surfaces to the thin metallic plates 10 and 11. The resilient member 9 is preferably arcuately rectangular in shape, and is bent or shaped into the curved form shown in Fig. 1 to extend about a portion of the lower periphery of the motor frame 5 with the plate 11 in contact with the motor frame.

The plate 11 is provided with laterally extending portions 12 projecting beyond the lateral edges of the member 9 and provided with openings through which suitable bolts 13 are extended to secure the plate 11 rigidly to the lower periphery of the motor frame 5. Suitable gasket means 11' may be interposed between the upper surface of the plate 11 and the surface of the motor frame if so desired. The lower plate 10 is supported on suitable boss surfaces 14 machined in the lower portion of the cradle 6. The portion of the cradle 6 which receives the plate 10 is cut below the normal thickness of the cradle at this point to provide a lateral flange portion or lip 15 at one edge thereof which engages one lateral edge of the plate 10 to hold the plate 10 against movement with respect to the cradle 6 in that direction.

At some point along the portion of the cradle 6 which supports the member 9, and preferably adjacent one end of the member 9, there is provided an extended boss 16 which is suitably tapped to receive a cap bolt 17 carrying a plate member 18 which engages the opposite lateral edge of the member 10 to prevent movement of the member outwardly of the cradle member 6. Several such stops may be provided, if so desired. Thus, the member 10 is confined at its lateral edges between the plate 18 and the flange 15, and thus cannot move laterally or transversely with respect to the cradle. Since the bolts 13 securely fix the plate 11 to the motor frame 5, the upper plate cannot move with respect to the motor frame and consequently any relative movement between these members will produce shear stresses in the resilient member 9, but will not result in displacement of the plates 10 and 11 with respect to the frame members to which they are secured. All relative movement is therefore absorbed and cushioned by the resilient member 9, and since no metallic contact is provided at any point along this supporting member between the motor frame and the cradle, it is obvious that no transmission of noise or vibration can be effected across this supporting member.

Figure 2:
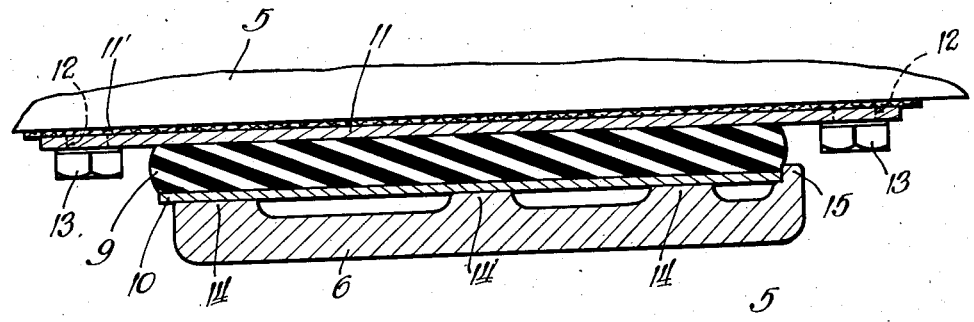
Figure 2 is a sectional view taken substantially on line 2—2 of Figure 1.
Figure 3:
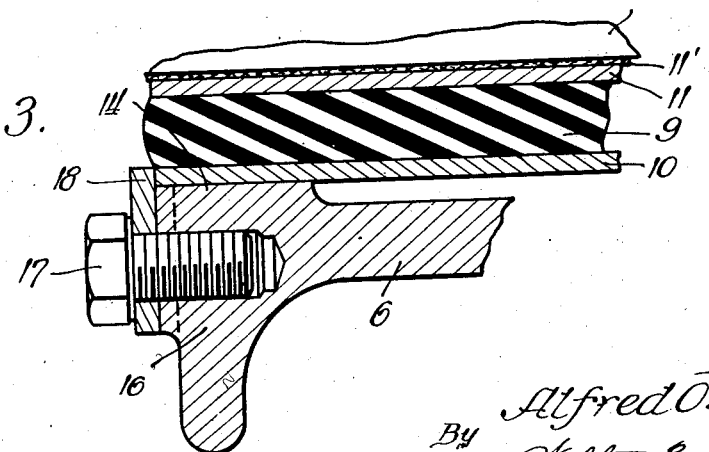
Figure 3 is a sectional view taken substantially on line 3—3 of Figure 1.

Considering the upper supporting means for the motor member, there is provided a second resilient cushioning member 20 of arcuate form and having the plates 22 and 23 vulcanized thereto substantially in the manner disclosed in Figure 4. The plate 22 has laterally extending portions 24 at opposite lateral edges thereof which are formed with suitable openings for receiving the bolts 25 whereby this plate is rigidly secured to the upper periphery of the motor frame. Inasmuch as the cap member 7 is removable from the cradle 6, it is necessary that no rigid connection between the cap member and the resilient supporting means be provided. However, in order to prevent relative movement of the plate member 23 with respect to the cap member 7 there is provided suitable bearing surfaces or bosses 26 on the under surface of the cap member which engage the upper surface of the plate 23 to hold the same against buckling, and at one lateral edge, the cap member 7 is provided with the downwardly extending flange 27 corresponding in function to the flange 15 of Figure 2.

The cap member is provided with spaced tapped openings 30 adapted to receive the threaded stud members 28 which are mounted therein, and which have the projecting stud portions 29 projecting through aligned openings in the plate member 23 and partially into the resilient material comprising the member 20. As a result, the plate 23 is prevented from relative movement with respect to the cap member 7 by the doweling action of the stud portions 29 of the studs 28 so that the plates 22 and 23 are rigidly secured to the respective motor frame and top plate. When the top plate 7 is clamped to the cradle by the bolts 8, this produces compression of the resilient members 9 and 20 between the respective plate surfaces 10 and 11, and 22 and 23. Thus, the resilient cushioning member is initially laterally compressed when the motor frame is clamped in the cradle, and any further stresses due to relative rotation of the motor frame within the cradle or due to transverse movement of the frame with respect to the cradle opening will be accommodated by the shear stresses imposed upon the resilient material. Because of the initial compression of the resilient material, the center of the motor is firmly held in position relative to the center of the cradle opening and the motor is thus prevented from any relative movement with respect to the supporting cradle. At the same time, the resilient material prevents metal to metal contact between the motor frame and the cradle, and thus prevents the transmission of any noises from the motor to the driving truck or to the car body.

I am aware that various changes in details of the supporting means may be made without departing from the underlying principles of the present invention, and I therefore do not intend to be limited except as defined by the scope and spirit of the appended claims.

I claim:

1. The combination, with a motor supporting cradle having an arcuate cylindrical portion and provided with a removable arcuate cap adapted to be secured to the ends of said portion to complete a cylindrical opening, and a motor housing of cylindrical form and of a diameter slightly less than the diameter of said opening, of cushioning means between said housing and said cradle and cap each comprising a rubber member of arcuate form having thin metallic plates vulcanized to the upper and lower surfaces thereof, one of each of said plates being rigidly secured to the motor housing, said cradle having a normally extending lip at one edge, the other plate of each cushioning means abutting against said lip, and means for holding said other plate against movement in a direction away from said lip, the thickness of said cushioning means being such that said rubber is compressed between said plates when said cap is secured to said cradle with the housing in position in said opening.

2. Cushioning means for supporting a cylindrical housing in an arcuate cradle comprising a rubber member of a curvature corresponding to said housing and having arcuately curved metallic plates vulcanized to the surfaces thereof, one of said plates projecting laterally beyond opposite longitudinal edges of said member and receiving means for securing said projecting portion to the external annular surface of said housing, and the other plate having openings extending therethrough and alined with corresponding depressions in the rubber member for receiving radially extending studs carried by said cradle.

3. The combination, with a cylindrical motor frame, a supporting cradle having an annular portion provided with a radially inwardly extending lip at one end thereof, of a cushioning member comprising a rubber member of arcuate form having thin metallic plates secured to opposite surfaces thereof, one of said plates projecting laterally of said rubber member at opposite edges and secured to said motor frame along said projecting portions, the other plate seating on said annular portion of said cradle and held against movement in one direction by said lip, and clamping means at the opposite end of said annular portion engaging the adjacent edge of said other plate to hold it against movement in the opposite direction.

4. The combination, with a cylindrical motor housing, and a pair of arcuate cradle members for supporting said housing, each of said members having a radially inwardly extending lip along one transverse edge thereof, of resilient cushioning means between each of said members and said housing including arcuately curved plates and a rubber intermediate member vulcanized therebetween, the inner plate of each cushioning means being of greater transverse width than said intermediate member and having the projecting ends thereof rigidly secured to said housing, the outer plate of each cushioning means having one transverse edge thereof abutting against the associated lips on said cradle members, means engaging the other transverse edge of one of said outer plates for limiting transverse movement thereof, and means engaging in the other of said outer plates for holding the same against the associated lip and also against longitudinal movement relative to the cradle member.

ALFRED O. WILLIAMS.